June 21, 1960 E. STUMP 2,941,641
SYNCHRONIZING CLUTCH
Filed Sept. 11, 1956
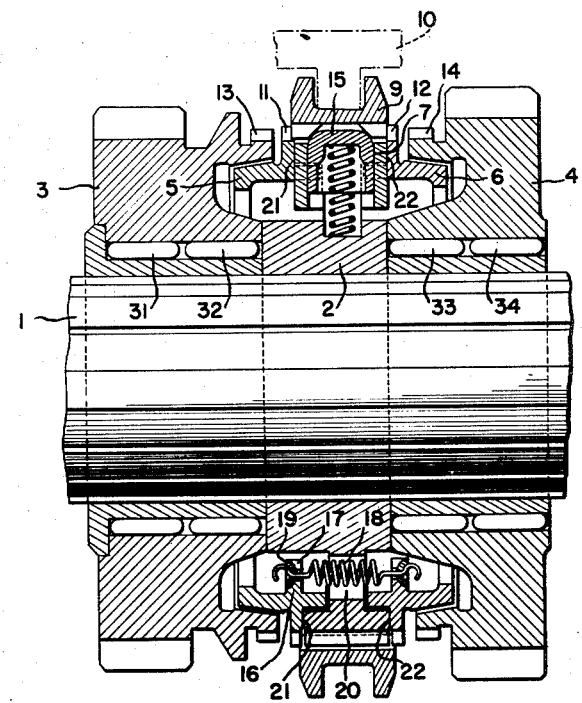
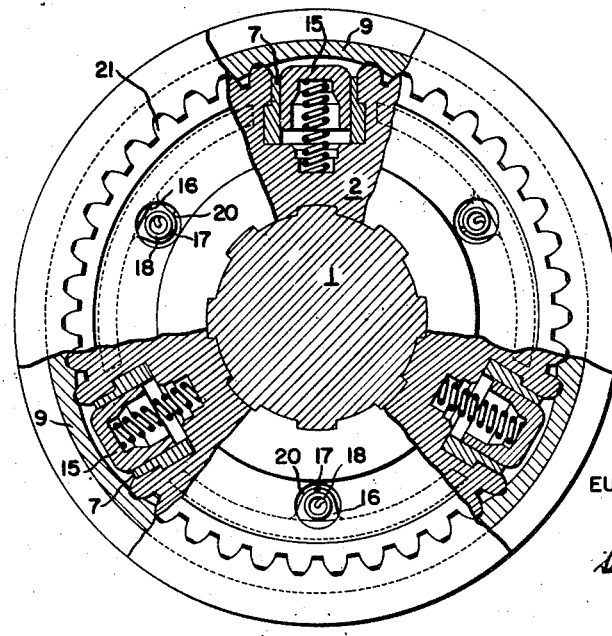
INVENTOR
EUGEN STUMP
ATTORNEYS

United States Patent Office 2,941,641
Patented June 21, 1960

2,941,641
SYNCHRONIZING CLUTCH

Eugen Stump, Stuttgart-Unterturkheim, Germany, assignor to Daimler-Benz Aktiengesellschaft, Stuttgart-Unterturkheim, Germany Filed Sept. 11, 1956, Ser. No. 609,152

Claims priority, application Germany Sept. 21, 1955

7 Claims. (Cl. 192—53)

The present invention relates to a synchronizing clutch in which a synchronizing ring carrying blocking teeth, upon axial movement thereof on one of the rotating members to be clutched, comes into frictional engagement with the other one of the rotating members to be clutched, and consists essentially in that one or several springs distributed over the periphery which are effective in the axial direction are provided which tend to displace the synchronizing ring in the direction of disengagement out of the frictional contact. In such a construction, the springs, on the one hand, may be secured at the synchronizing ring, and, on the other, at the rotating member which carries the synchronizing ring.

In those arrangements in which one of the rotating clutch members carries on both sides thereof one axially displaceable synchronizing ring each for clutching engagement with a rotating member disposed adjacent thereto, the springs may be secured to both synchronizing rings and thereby tend to move the same toward each other.

As compared to the prior art synchronizing clutches in which such springs were missing, the arrangement in accordance with the present invention offers in particular, the advantage that the friction cones in the disengaged positions thereof do not come in contact with the counterparts thereof whereby, on the one hand, unnecessary wear is avoided and, on the other, smaller friction losses occur in the transmission.

In accordance with a further feature of the basic invention, it is proposed that in connection with an arrangement as mentioned hereinabove which has two synchronizing rings, these two synchronizing rings under the effect of the springs abut against the clutch member which carries the same, and thereby simultaneously center in the axial direction the entrainment pieces for the synchronizing rings which entrainment pieces are axially displaceable on the clutch member. By the use of such a construction, it is possible that the entrainment pieces need no longer be retained in the axial direction, as heretofore, by means of the shifting sleeve and the shifting fork but that instead the centering thereof takes place automatically within the synchronizing clutch itself.

An overall arrangement which is simple as regards construction thereof, and in which the springs in accordance with the present invention adapt themselves organically to the overall construction of the clutch will be realized if the synchronizing rings are provided at the inside thereof with projections for securing thereon the springs formed as tension or draw springs, which in turn extend through an aperture provided in the clutch member which carries the synchronizing rings.

In order to preclude distortions of the springs at the abutment places thereof as a result of the relative rotation about the width of the blocking teeth between the synchronizing rings and the clutch member, the present invention further proposes that the ends of the draw springs be secured by the insertion of pressure-supporting or seating pieces provided with semi-spherical seating surfaces at the parts of the clutch which are connected by the springs.

Accordingly, it is an object of the present invention to provide a synchronizing clutch which is relatively simple in construction.

Another object of the present invention resides in the provision of an arrangement of a synchronizing clutch which assures disengagement of the synchronizing rings, and more particularly, of the conical friction surfaces thereof with the conically shaped countersurfaces of the parts to be synchronized when the synchronizing clutch is disengaged so as to eliminate unnecessary wear in the friction surfaces and to minimize the friction losses in the transmission.

A still further object of the present invention resides in the provision of springs in the synchronizing clutch which will tend to move the synchronizing rings towards each other and which, at the same time, effect axially centering of the entrainment pieces of the synchronizing clutch.

These and other objects, features and advantages in accordance with the present invention will become more obvious from the following description when taken in connection with the accompanying drawing, which shows, for purposes of illustration only, one preferred embodiment in accordance with the present invention and wherein:

Figure 1 is a longitudinal axial view through a synchronizing clutch in accordance with the present invention, and Figure 2 is a side view with parts removed therefrom so as to show some of the details in cross section of the synchronizing clutch illustrated in Figure 1.

Referring now more particularly to the drawing, wherein like reference numerals are used throughout the various views to designate like parts, reference numeral 1 designates a shaft which is provided with external splined teeth. The clutch member 2 which carries the synchronization arrangement in accordance with the present invention is splined to the shaft 1 for common rotation therewith. The members 3 and 4 which are to be alternately clutched with the clutch member 2 by the synchronizing clutch in accordance with the present invention are arranged on the shaft 1 in a freely rotatable manner, for example, by the interposition of suitable needle bearings 31, 32, 33 and 34.

Two synchronizing rings 5 and 6 are supported in an axially displaceable manner on the clutch member 2 and with the external conical friction surfaces thereof may be forced into and against the internal conically shaped countersurfaces of the clutch members 3 and 4 respectively.

Furthermore, entrainment pieces 7 are arranged in the clutch member 2 which are axially displaceable with respect thereto. The clutch member 2 and the entrainment pieces 7 are surrounded by a shifting sleeve 9 which may be displaced in the axial direction thereof by an actuating mechanism schematically illustrated in the drawing and designated by reference numeral 10. The shifting sleeve 9 is in toothed or splined engagement with respect to the clutch member 2 and upon axial displacement thereof and upon forcible sideways displacement of the blocking teeth 11 and 12 provided at the synchronizing rings 5 and 6 respectively may come into engagement with the clutch teeth 13 and 14 which are provided at the clutch members 3 and 4 respectively whereby a positive connection is established between the clutch member 2 and the clutch member 3 or 4 respectively. The entrainment pieces 7 are connected with the shifting sleeve 9 over spring loaded arresting pins 15. These pins, as shown in Figures 1 and 2, are hollow, and their interiors comprise abutment surfaces at the ends of the pins. The springs shown in these figures extend radially from the clutch member 2 into the interior of the pins and engage these abutment surfaces. Since such synchronizing clutches as such are known the operation will not be described herein in detail.

The synchronizing rings 5 and 6 in accordance with the present invention are provided with internal projections 16 which in turn are provided with slots 17 for the insertion therein of tension or draw springs 18. The draw springs 18 thereby support themselves over the pressure-supporting pieces 19 provided with hemispherically seating surfaces against the projections 16 and extend through the coupling member 2 in bores 20.

By reason of the force exerted by the draw springs 18 the synchronizing rings 5 and 6 are forced against the end faces 21 and 22 of the clutch member 2 and in turn retain with the same end faces the axially displaceable entrainment pieces 7 in the center position thereof.

It is thus seen that the draw springs 18 tend at all times to produce disengagement of the conical friction surfaces when the synchronizing clutch is disengaged and, at the same time, center the entrainment pieces 7 in the axial direction thereof.

While I have shown and described one preferred embodiment in accordance with the present invention, it is understood that the same is not limited to the details described herein but is susceptible of many changes and modifications within the spirit of the present invention and I intend to cover all such changes and modifications except as defined by the appended claims.

I claim:

1. A synchronizing clutch comprising a first rotating clutch member and two further rotating members, one each of said two rotating members being rotated on each side of said first rotating clutch member and being adapted to be alternately clutched to said first rotating clutch member by means including a shifting sleeve, one synchronizing ring on each side of said first rotating clutch member, each ring being provided with blocking teeth and carried by and axially movable on said first rotating clutch member to establish clutching engagement with a respective one of said two rotating members, said two rotating members and said synchronizing rings being provided with complementary friction surfaces adapted to produce synchronization when brought into mutual engagement, hollow entrainment pieces for said synchronizing rings, mounting means for said entrainment pieces on said first rotating clutch member, said mounting means comprises means preventing outward radial movement of said entrainment pieces, means connecting said entrainment pieces with said shifting sleeve comprising hollow pins disposed within the interiors of said hollow entrainment pieces, the interior of said hollow pins comprising abutment surfaces on said pins, springs extending radially from said first rotating clutch member into said interiors of said pins and engaging said abutment surfaces, said synchronizing rings abutting said entrainment pieces, and means for opposing axial movement of said entrainment pieces comprising spring means secured to said two synchronizing rings effective in the axial direction of said synchronizing clutch and tending to displace said synchronizing rings toward each other and toward said entrainment pieces in the direction of disengagement of the frictional contact of said friction surfaces.

2. A synchronizing clutch according to claim 1, wherein said means for preventing outward radial movement of said entrainment pieces comprises cooperating shoulder means on said entrainment pieces and on said first rotating clutch member.

3. A synchronizing clutch according to claim 1, wherein said mounting means for said entrainment pieces comprises recesses in said first rotating clutch members, said recesses having bottom wall portions and said entrainment pieces being supported by said bottom wall portions.

4. A synchronizing clutch comprising a first rotating clutch member having a toothed periphery and two further rotating members, one each of said two rotating members being rotated on each side of said first rotating member and being adapted to be alternately clutched to said first rotating member, one synchronizing ring on each side of said first rotating clutch member, each ring being provided with blocking teeth and carried by and axially movable on said first rotating clutch member to establish clutching engagement with a respective one of said two rotating members, said two rotating members and said synchronizing rings being provided with complementary friction surfaces adapted to produce synchronization when brought into mutual engagement, said first rotating clutch member being provided with circular bores, said bores being spaced inwardly from said toothed periphery, said synchronizing rings being provided with projections integral therewith and extending internally of said rings, said projections being provided with hemispherically shaped seating surfaces, contractile springs extending through said bores, means connecting the ends of said contractile springs with said projections, said means comprising pressure-supporting means having hemispherically shaped seating surfaces cooperating with said first-mentioned seating surfaces.

5. A synchronizing clutch according to claim 4, wherein said projections are provided with slots, said pressure-supporting means being disposed adjacent said slots and said springs extending through said slots into engagement with said pressure-supporting means.

6. A synchronizing clutch according to claim 4, wherein the said projections on said rings have sides facing in directions outwardly of said spring, and said first-mentioned hemispherically shaped seating surfaces being located in said sides.

7. A synchronizing clutch according to claim 4, wherein said contractile springs have bent end portions engaging said pressure-supporting means, and have further portions passing through said pressure-supporting means.

References Cited in the file of this patent

UNITED STATES PATENTS

| | | |
|---|---|---|
| 1,838,946 | Kelley | Dec. 29, 1931 |
| 1,901,712 | Christman | Mar. 14, 1933 |
| 2,201,149 | Best | May 21, 1940 |
| 2,221,894 | White | Nov. 19, 1940 |
| 2,410,511 | Letsinger et al. | Nov. 5, 1946 |

FOREIGN PATENTS

| | | |
|---|---|---|
| 494,338 | Great Britain | Oct. 19, 1938 |
| 494,411 | Great Britain | Oct. 19, 1938 |